United States Patent Office 3,340,308
Patented Sept. 5, 1967

3,340,308
2-PROPYNYLOXY DERIVATIVES OF SUBSTITUTED BISPHENOLS
George B. Sterling, Mogadore, Ohio, and Chester E. Pawloski, Bay City, Mich., assignors to The Dow Chemical Company, Midland, Mich., a corporation of Delaware
No Drawing. Filed Dec. 26, 1963, Ser. No. 333,679
7 Claims. (Cl. 260—613)

The novel compounds of the present invention correspond to the following formula:

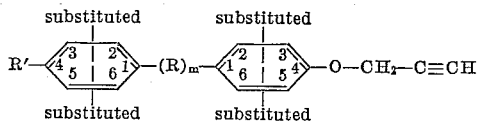

In this and succeeding formulae, the di-substituted 1,4-phenylene moiety is selected from the group consisting of 3,5-di-tert.-butyl-1,4-phenylene, 2-methyl-5-tert.-butyl-1,4-phenylene, 3-methyl-5-tert.-butyl-1,4-phenylene and 5-cyclohexyl-1,4-phenylene; R represents methylene, n-butylidene or cyclohexylidene; m represents one of the integers 0 and 1 and R' represents hydroxy or 2-propynyloxy. These compounds are organic liquids or solids which are somewhat soluble in many organic solvents but of low solubility in water. These compounds have been found to be useful as pesticides and are adapted to be employed as toxic constituents in compositions for the control of various plant, insect, fish, fungal, bacteria and helminth organisms such as roaches, carp, mites, tapeworms, ascarids and plum curculio.

The compounds of the present invention are prepared by reacting propargyl halide with a substituted di(p-phenylene) compound corresponding to the formula:

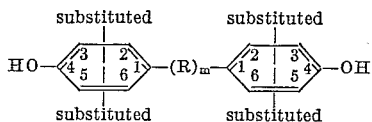

The reaction is carried out in the presence of a basic material such as an alkali metal carbonate and preferably in the presence of an organic liquid reaction medium such as acetone, methyl ethyl ketone or isopropanol. The reaction takes place smoothly at temperatures at which halide of reaction is produced and preferably at temperatures from about 0° to 100° C. The halide of reaction appears in the reaction mixture as the salt of the alkali metal cation from the employed basic material. Representative alkali metals include sodium and potassium. Good results are obtained when employing one molecular proportion of the substituted di-(p-phenylene) compound with from about one to two molecular proportions of each of the propargyl halide and basic material depending upon whether it is desired to introduce one or two propargyl groups into the molecule. The reaction consumes one molecular proportion of each of the propargyl halide and basic material for each introduced 2-propynyl group. For optimum yields the use of molecular amounts which represent such proportions is preferred.

In carrying out the reaction, a di-(p-phenylene) compound, such as 4,4'-n-butylidene bis(2,6-di-tert.-butylphenol), 4,4'-cyclohexylidene-bis(6-tert.-butyl-3-methylphenol), 4,4'-n-butylidene-bis(6-tert.-butyl-3-methylphenol), 4,4'-n-butylidene-bis(2-cyclohexylphenol), 4,4'-cyclohexylidene bis(2,6-di-tert.-butylphenol), 4,4'-methylene bis(2-cyclohexylphenol), 4,4'-cyclohexylidene bis(6-tert.-butyl-2-methylphenol), 4,4'-bis(2-methyl-6-tert.-butylphenol), 4,4'-bis(6-tert.-butyl-3-methylphenol); propargyl halide and basic material can be combined in any convenient fashion. It is, however, preferable to disperse them in an organic solvent, as reaction medium. The mixture is maintained in the reaction temperature range for a period of time to insure completion of the reaction. The substantial cessation in the production of the halide of reaction indicates that the reaction is nearing completion. The halide of reaction can be removed from the reaction mixture by such conventional procedures as filtration or washing with water. The product-containing organic layer which separates during the washing procedure can then be employed as the toxic constituent in pesticidal applications. If a product of greater purity is desired, the filtered reaction mixture can be washed with water and the product-containing organic layer, obtained during the washing procedure, heated to remove the low boiling constituents and obtain the product as a solid or liquid residue. This product residue can be further purified by recrystallization from or extraction with common organic solvents. The following examples are merely illustrations and should not be construed as limiting.

*Example 1.—4-hydroxy-4'-(2-propynyloxy)-bis(3,5-di-tert.-butylphenyl)methane*

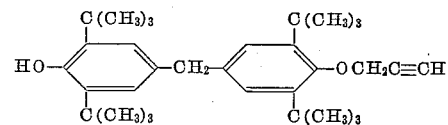

4,4' - methylene bis(2,6 - di - tert. - butylphenol) (25 grams), propargyl bromide (14 grams) and potassium carbonate (16 grams) were dispersed in 200 milliliters of acetone. The resulting mixture was heated with stirring at the boiling temperature and under reflux for twenty hours. The reaction mixture was filtered while hot to remove the halide of reaction. The filtrate was collected and heated to remove the low boiling constituents and obtain the 4-hydroxy-4'-(2-propynyloxy)-bis(3,5-di-tert.-butylphenyl)methane product as a thick dark liquid having a refractive index n/D of 1.5195 at 25° C.

*Example 2.—1,1-bis[5-tert.-butyl-4-(2-propynyloxy)-2-methylphenyl]butane*

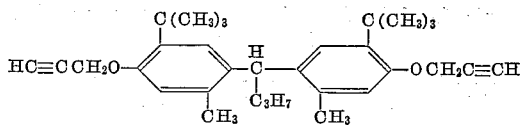

4,4' - butylidene bis(6-tert.-butyl-3-methylphenol) (50 grams), propargyl bromide (35 grams) and potassium carbonate (38 grams) were dispersed in 400 milliliters of acetone. The resulting mixture was heated with stirring at the boiling temperature and under reflux for twenty-four hours. At the termination of this heating period 60 milliliters of aqueous 33 percent sodium hydroxide solution is added to the reaction mixture and the resulting mixture heated for a short time. Following the second heating period the reaction mixture was filtered and the filtrate heated to remove the low boiling constituents and obtain the 1,1-bis[5-tert.-butyl-4-(2-propynyloxy)-2-methylphenyl]butane product as a liquid residue having a refractive index n/D of 1.5130 at 25° C. Upon standing, the liquid product solidified The product in the solid state melted at 78–79° C

*Example 3.—4 - hydroxy-4'-(2-propynyloxy)-bis(3-tert.-butyl-5-methylphenyl)methane*

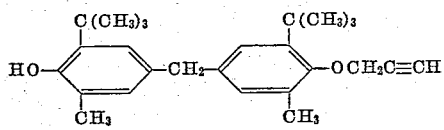

4,4'-methylene bis(6-tert.-butyl-2-methylphenol) (25 grams), propargyl bromide (22 grams) and potassium carbonate (22 grams) were processed exactly as described in Example 1, to obtain the 4-hydroxy-4'-(2-propynyloxy) - bis(3 - tert. - butyl-5 - methylphenyl) methane product as a liquid having a refractive index n/D of 1.5478 at 25° C.

*Example 4.—3,3',5,5'-tetra-tert.-butyl-4,4'-bis-(2-propynyloxy)biphenyl*

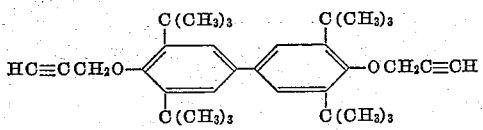

4,4'-bis(2,6-di-tert.-butylphenol) (25 grams), propargyl bromide (18 grams) and potassium carbonate (18 grams) were dispersed in 200 milliliters of acetone. The mixture of reactants was then heated with stirring at the boiling temperature and under reflux for eighty hours. The reaction mixture was then processed in the manner described in Example 1 to obtain the 3,3'5,5'-terta-tert.-butyl-4,4'-bis(2-propynyloxy)biphenyl product as solid residue which melted at 97°–100° C.

*Example 5.—1,1 - bis(3 - cyclohexyl-4-(2-propynyloxy) phenyl)cyclohexane*

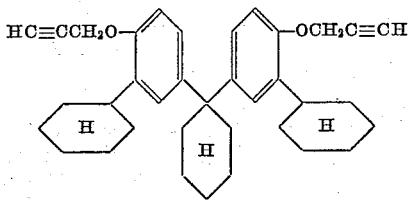

4,4' - cyclohexylidene bis(2 - cyclohexylphenol) (25 grams), propargyl bromide (16 grams) and potassium carbonate (18 grams) were dispersed in 300 milliliters of acetone. The mixture of reactants was then heated with stirring at the boiling temperature and under reflux for thirty hours. Following this heating period, the reaction mixture was processed exactly as descrbed in Example 1 to obtain the 1,1 - bis(3-cyclohexyl-4-(2-propynyloxy)phenyl)cyclohexane product as a solid material which melted at 42°–43° C.

*Example 6.—1,4 - bis[3,4 - bis(2-propynyloxy)phenyl] 2,3dimethylbutane*

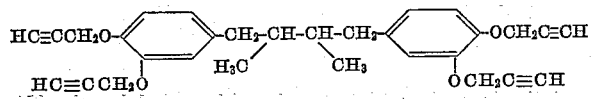

4,4' - (2,3 - dimethyltetramethylene)dipyrocatechol (11.5 grams), propargyl bromide (20 grams) and potassium carbonate (22 grams) were dispersed in 200 milliliters of acetone. The resulting mixture was heated with stirring at the boiling temperature and under reflux for twenty-four hours. The warm reaction mixture was combined with 30 milliliters of aqueous 33 percent sodium hydroxide and processed exactly as described in Example 2 to obtain the 1,4-bis[3,4-bis(2-propynyloxy)phenyl] 2,3-dimethylbutane product as a liquid residue having a refractive index n/D of 1.5625 at 25° C.

In a similar manner, the following compounds of the present invention are prepared.

4,4' - di - (2 - propynyloxy) - bis(3,5 - di - tert.-butyl-phenyl)-methane (molecular weight of 500.7) by reacting together 4,4'-methylene bis(2,6-di-tert.-butylphenol), propargyl bromide and sodium carbonate.

4 - hydroxy - 4'-(2-propynyloxy)-1,1-bis(3-tert.-butyl-phenyl)butane (molecular weight of 420.7) by reacting together 4,4'-butylidene-bis(6 - tert. - butyl - 3-methylphenol), propargyl chloride and sodium carbonate.

4,4'-di - (2 - propynyloxy)-bis-(2-methyl-5-tert.-butylphenyl)methane (molecular weight of 416.5) by reacting together 4,4'-methylene-bis-(6 - tert.-butyl-2-methylphenol), propargyl chloride and potassium carbonate.

3,3',5,5' - tetra - tert. - butyl-4-hydroxy-4'-(2 - propynyloxy)-biphenyl (molecular weight 449.7) by reacting together 4,4'-bis(2,6-di-tert.-butylphenol), propargyl bromide, and sodium carbonate.

4 - hydroxy-4'-(2-propynyloxy) - 1,1-bis(3-cyclohexyl-phenyl)-cyclohexane (molecular weight 470.7) by reacting together cyclohexylidene-bis(cyclohexyphonel), propargyl bromide and potassium carbonate.

The compounds of the present invention have been found to be useful as the toxic constituent in compositions employed for the killing and control of various plant and animal pests such as worms, insects, fish, fungi and bacteria. For such uses, the unmodified compound can be employed or the compound can be dispersed on an inert finely divided solid such as talc, chalk or bentonite and employed as a dust. Also, such mixtures can be dispersed in water, with or without the aid of a surface active dispersing agent, and the resulting aqueous suspension employed as sprays, drenches or washes. In other procedures, the products can be employed as the toxic constituent in solvent solutions, oil-in-water and water-in-oil emulsions or aqueous dispersions.

In representative operations, aqueous dispersions containing 4 - hydroxy-4'-(2-propynyloxy)-bis(3,5-di-tert.-butylphenyl)methane at concentrations of 500 parts per million by weight give substantially complete kills of two spotted spider mites. In other operations, 1,4-bis[3,4-bis(2-propynyloxy)phenyl]-2,3-dimethylbutane is also useful as a pesticide for the control of the named pests. In representative operations, aqueous compositions containing the compound at concentrations of 500 parts per million by weight, give 100 percent kills of southern armyworms.

The substituted di(p-phenylene) compounds employed as starting materials in accordance with the present invention can be prepared by known methods. In one such procedure, a suitable substituted phenol such as 2,6-di-tert.-butylphenol, 3-methyl-5-tert.-butylphenol, or 2-cyclohexylphenol is combined with cyclohexanone, formaldehyde, or n-butyraldehyde in the presence of a sulfur containing catalyst such as hydrogen sulfide or normal butylmercaptan and an acid condensing agent such as sulfuric acid or hydrochloric acid. The reaction is carried out at a temperature of 40° C. or lower. Following the reaction, the product is separated by conventional procedures.

We claim:

1. A compound corresponding to the formula

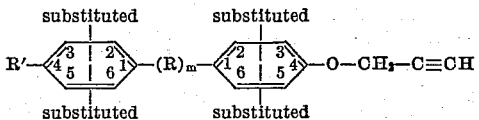

wherein R represents a member of the group consisting of methylene, n-butylidene and cyclohexylidene; *m* is selected from a group of integers consisting of 1 and 0; R' represents a member of the group consisting of hydroxy and 2-propynyloxy; and the di-substituted 1,4-phenylene moiety is selected from the group consisting of 3,5-di-tert.-butyl-1,4-phenylene, 2-methyl-5-tert.-butyl-1,4-phenylene, 3-methyl-5-tert.-butyl-1,4-phenylene and 5-cyclohexyl-1,4-phenylene.

2. 4 - hydroxy-4'-(2 - propynyloxy)-bis(3,5-di-tert.-butylphenyl)methane.

3. 1,1 - bis[5-tert.-butyl-4-(2 - propynyloxy)-2-methylphenyl]butane.

4. 4 - hydroxy-4'-(2 - propynyloxy)-bis(3-tert.-butyl-5-methylphenyl)methane.

5. 3,3',5,5' - tetra - tert. - butyl-4,4'-bis(2-propynyloxy) biphenyl.

6. 1,1 - bis(3-cyclohexyl-4-(2-propynyloxy)-phenyl)cyclohexane.

7. 1,4 - bis[3,4 - bis(2 - propynyloxy)phenyl] - 2,3-dimethyl)butane.

References Cited
UNITED STATES PATENTS

| | | | |
|---|---|---|---|
| 2,321,620 | 6/1943 | Pratt | 260—619 |
| 2,889,244 | 6/1959 | Youngson | 167—22 |
| 2,894,004 | 7/1959 | Dietzler | 167—31 X |
| 2,944,086 | 7/1960 | Coffield et al. | 167—31 X |
| 3,122,563 | 2/1964 | Kaiser | 260—613 X |

LEON ZITVER, *Primary Examiner.*

B. HELFIN, *Assistant Examiner.*